United States Patent

Jeong et al.

[11] Patent Number: 5,880,909
[45] Date of Patent: Mar. 9, 1999

[54] AUDIO/CONTROL HEAD CONNECTING DEVICE OF TAPE RECORDER

[75] Inventors: Yong-chae Jeong; Byung-sam Son; Myung-sub Jang, all of Suwon; Chung-ung Kim, Seoul, all of Rep. of Korea

[73] Assignee: Samsung Electronics Co., Ltd., Kyungki-do, Rep. of Korea

[21] Appl. No.: 887,894

[22] Filed: Jul. 3, 1997

[30] Foreign Application Priority Data

Jul. 15, 1996 [KR] Rep. of Korea .................. 96-28623

[51] Int. Cl.⁶ .................................................. G11B 5/48
[52] U.S. Cl. ........................................................ 360/104
[58] Field of Search .................................. 360/103–106, 360/94, 96.5, 133, 132

[56] References Cited

U.S. PATENT DOCUMENTS

| | | | |
|---|---|---|---|
| 5,390,870 | 2/1995 | Sawada et al. | 360/94 |
| 5,444,588 | 8/1995 | Choi | 360/104 |
| 5,506,736 | 4/1996 | Ota | 360/94 |
| 5,535,080 | 7/1996 | Inoue et al. | 360/104 |

*Primary Examiner*—Allen T. Cao
*Attorney, Agent, or Firm*—Sughrue, Mion, Zinn, Macpeak & Seas, PLLC

[57] ABSTRACT

In an audio/control (A/C) head connecting device of a tape recorder, a main circuit board installed under a main deck applies an electrical signal to an A/C head on the main deck. A sub-circuit board is formed at the A/C head to electrically connect the A/C head to which the electrical signal is applied. A support is installed on the main circuit board. Thus, the sub-circuit board having a connecting port passes through an opening in the main deck and is electrically connected to an elastic connecting member installed at the support.

5 Claims, 2 Drawing Sheets

AUDIO/CONTROL HEAD CONNECTING DEVICE OF TAPE RECORDER

BACKGROUND OF THE INVENTION

The present invention relates to an audio/control head (hereinafter referred to as an "A/C head") connecting device of a tape recorder having a simplified structure and providing easy connectivity.

In general, there is a recording area on a magnetic tape for recording an audio signal and a control signal. Referring to FIG. 1, a video tape recorder is provided with an A/C head 20 which has a recording head 20b for recording audio/control signals on the recording area and an erasing head 20a for erasing a video signal recorded on the recording area.

The A/C head 20 is installed on a sub-plate 13 fixed to a main plate 12. The main plate 12 is rotatably installed on a main deck 10, and can be rotated by a control gear 11 having a first gear portion 11a meshed with a second gear portion 12a formed on the main plate 12.

The A/C head 20 is electrically connected to and controlled by a circuit board (not shown) installed under the main deck 10. That is, the circuit board has a connection member 19 protruding from the main deck 10 and penetrating the main deck 10, and the connection member 19 supports a bundle of wires 1 which is connected to the A/C head 20 so that the A/C head 20 can receive the audio/control signals via the wires 1. The wires 1 are installed such that they do not affect the rotation of the main plate 12 by the control gear 11.

However, such a connecting device has a complicated structure and it is difficult to assemble the connecting device. That is, the wires 1 are installed after the A/C head 20 and the connection member 19 are installed.

SUMMARY OP THE INVENTION

To overcome the above problems, it is an object of the present invention to provide an A/C head connecting device of a tape recorder by which an A/C head of the tape recorder can be simply and easily connected to a main circuit board.

Accordingly, to achieve the above object, there is provided an A/C head connecting device of a tape recorder which includes a main circuit board installed under a main deck for generating a predetermined signal, and a connecting mechanism for elastically connecting an A/C head which receives the signal.

The connecting mechanism includes a sub-circuit board extending downward from the A/C head and having at least one connecting port, and a support installed on the main circuit board. Preferably, the support is comprised of two plates installed substantially in parallel on the main circuit board, and at least one elastic connecting port, e.g., a leaf spring, is installed on one of the two plates. The sub-circuit plate passes through an opening formed in the main deck and is inserted between the two plates. The connecting port of the sub-circuit board slides into and contacts the elastic connecting port of the support.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE INVENTION

Figure 1:
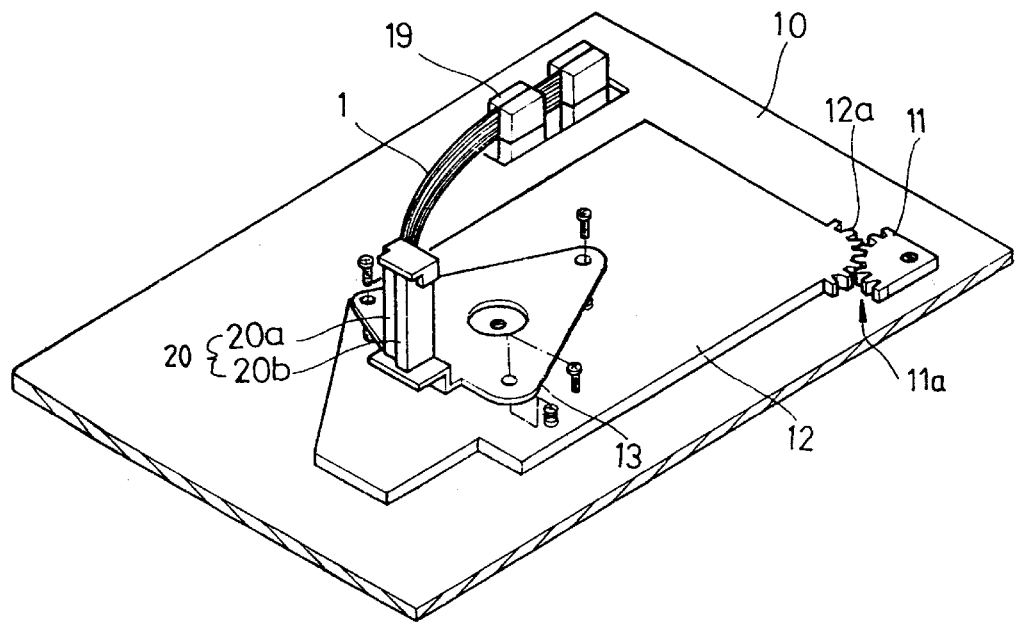
FIG. 1 is a perspective view for illustrating a portion of a tape recorder employing a conventional A/C head connecting device.
Figure 2:
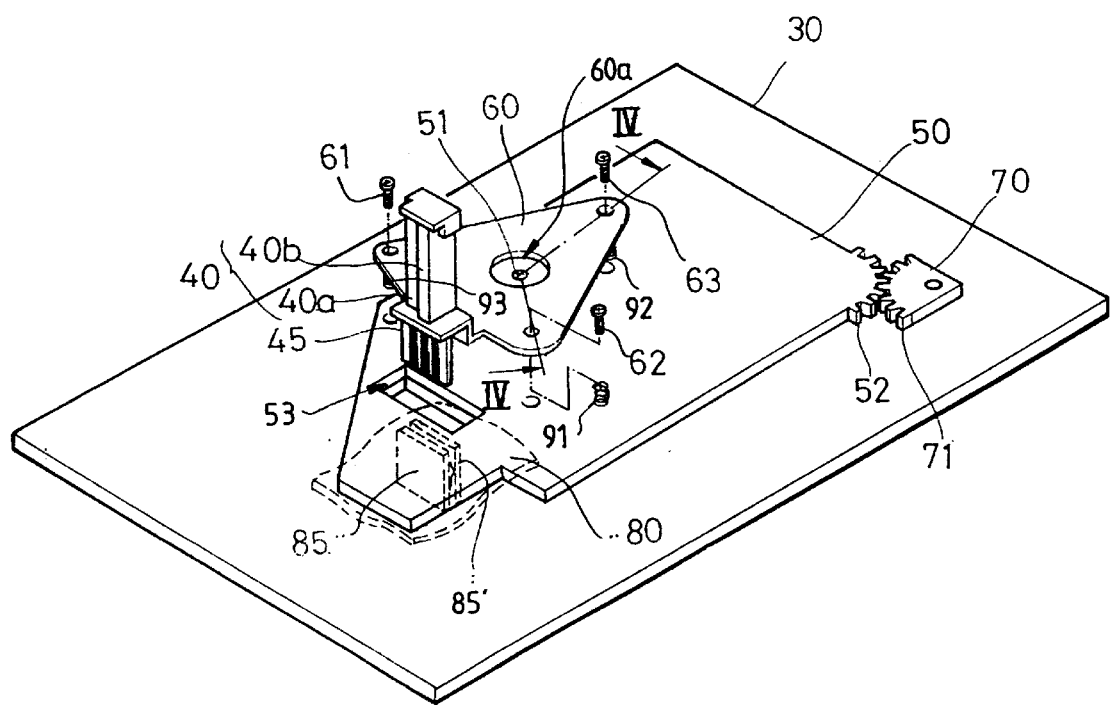
FIG. 2 is a perspective view for illustrating a portion of a tape recorder employing an A/C head connecting device according to the present invention.
Figure 4:
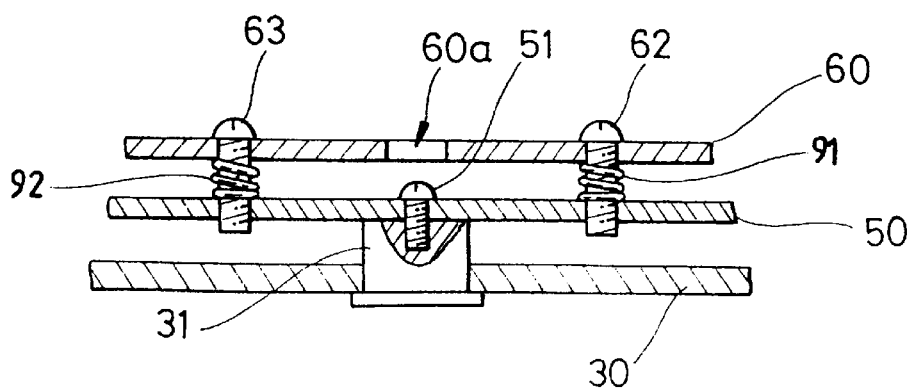
FIG. 4 is a sectional view taken along ling IV—IV of FIG. 2.

Referring to FIGS. 2 and 4, which show an A/C head connecting device of a tape recorder according to the present invention, a boss 31 (see FIG. 4) is formed on a main deck 30 and the main deck 30 is coupled with the boss 31 by means of a screw 51 so that the main plate 50, which has a geared portion 52 at one side edge thereof, is rotatable. Also, a control gear 70 having gear teeth 71 to be engaged with the geared portion 52 of the main plate 50 is rotatably installed on the main deck 30.

A sub-plate 60 on which an A/C head 40 is installed is fixed by a plurality of control screws 61, 62 and 63. The control screws 61, 62 and 63, at a position between the sub-plate 60 and the main plate 50, are provided with spring members 93, 91 and 92, respectively. A access hole 60a is formed in the sub-plate 60 to assemble and disassemble the screw 51.

The A/C head 40 comprises an erasing head 40a for erasing video signals recorded on a magnetic tape (not shown), and a recording head 40b for recording audio signals and control signals on the magnetic tape from which the video signals are removed. The distance between the A/C head 40 and the magnetic tape can be appropriately controlled by rotating the main plate 50 a predetermined number of degrees using the control gear 70. Also, the A/C head 40 is electrically connected to a main circuit board 80 disposed under the main deck 30 by means of a connecting mechanism.

Figure 3:
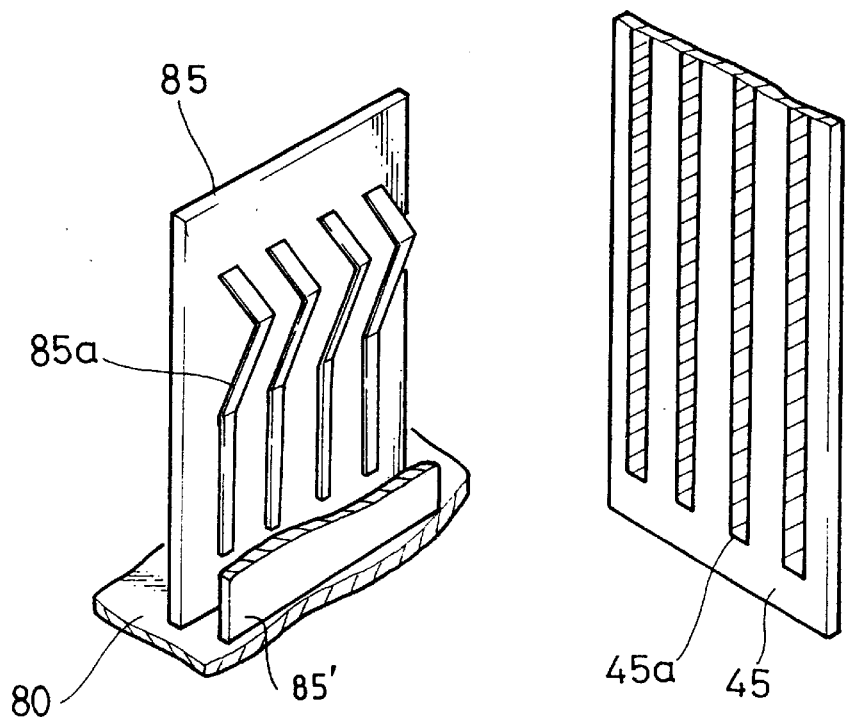
FIG. 3 is a partially cut-away perspective view for illustrating the supports and the sub-circuit board of FIG. 2.

Referring to FIGS. 2 and 3, the connecting mechanism extends downward from the A/C head 40, and includes a sub-circuit board 45 having a plurality of connecting ports 45a spaced a predetermined distance apart from each other, and supports 85 and 85' installed so as to extend vertically or upright from the main circuit board 80 and having a plurality of elastic connecting ports 85a to connect to the connecting ports 45a which are installed between the supports 85 and 85'.

It is preferable that the supports 85 and 85' are two plates installed parallel to each other on the main circuit board 80 so that the sub-circuit board 45 can be inserted between the supports 85 and 85'. Preferably, each of the elastic connecting ports 85a is a leaf spring elastically deformable to easily connect to a corresponding one of the connecting ports 45a. Due to the flexibility of each of the elastic connecting ports 85a, the connecting ports 45a can stably maintain connection to the respective elastic connecting ports 85a when the main plate 50 is rotated by the control gear 70.

In the assembly of the A/C head connecting device according to the present invention, the A/C head 40 is assembled to the sub-plate 60 and then the sub-plate 60 is fixed above the main plate 50. In this case, the sub-circuit board 45 of the A/C head 40, protruding under the main deck 30 via an opening 53 formed through the main plate 50 and a corresponding opening in the main deck 30, is inserted between the supports 85 and 85'. Thus, the respective connecting ports 45a of the sub-circuit board 45 contact the corresponding elastic connecting ports 85a by sliding between the supports 85 and 85'.

As described above, the A/C head connecting device according to the present invention has a simplified structure, in which wires are removed therefrom and makes the connection easy using the connecting ports and the elastic connecting ports.

It is contemplated that numerous modifications may be made to the audio control head connecting device for a tape recorder of the present invention without departing from the spirit and scope of the invention as defined in the following claims.

What is claimed is:

1. An audio/control (A/C) head connecting device of a tape recorder which includes a main deck having an opening, said A/C head connecting device comprising:

an A/C head installed above the main deck;

a main circuit board installed under the main deck for applying an electrical signal to said A/C head;

a sub-circuit board having at least one connecting port and extending downward from said A/C head to protrude under the main deck while passing through the opening formed in the main deck; and a support installed upright on said main circuit board and having at least one elastic connecting port which is operative to be elastically connected to said at least one connecting port of said sub-circuit board protruding under the main deck, wherein said support comprises two plates installed substantially in parallel on said main circuit board to allow said sub-circuit board to be inserted between said two plates; and said at least one elastic connecting port, which is installed on one of said two plates, is electrically connected to said at least one connecting port of said sub-circuit board.

2. The A/C head connecting device as claimed in claim 1, wherein said at least one elastic connecting port is an elastically deformable leaf spring.

3. An audio/control (A/C) head connecting device of a tape recorder which includes a main deck having an opening, said A/C head connecting device comprising:

an A/C head installed above the main deck;

a main circuit board installed under the main deck for applying an electrical signal to said A/C head;

a sub-circuit board having at least one connecting port and extending downward from said A/C head to protrude under the main deck while passing through the opening formed in the main deck;

a support installed upright on said main circuit board and having at least one elastic connecting port which is operative to be elastically connected to said at least one connecting port of said sub-circuit board protruding under the main deck;

a main plate, on which said A/C head is installed, rotatably mounted to the main deck and having a geared portion at one side edge thereof; and a control gear rotatably installed above the main deck and which meshes with said geared portion of said main plate.

4. An audio/control (A/C) head connecting device of a tape recorder which includes a main deck having an opening, said A/C head connecting device comprising:

an A/C head installed above the main deck;

a main circuit board installed under the main deck for applying an electrical signal to said A/C head;

a sub-circuit board having at least one connecting port and extending downward from said A/C head to protrude under the main deck while passing through the opening formed in the main deck;

a support installed upright on said main circuit board and having at least one elastic connecting port which is operative to be elastically connected to said at least one connecting port of said sub-circuit board protruding under the main deck;

a main plate rotatably mounted to the main deck; and a sub-plate fixedly mounted to said main plate and having said A/C head mounted thereon.

5. The A/C head connecting device as claimed in claim 4, further comprising a control gear rotatably mounted to the main deck, wherein said main plate has a geared portion at a side edge thereof which engages said control gear.

* * * * *